UNITED STATES PATENT OFFICE.

SAMUEL A. SEALY, OF BROOKLYN, NEW YORK.

IMPROVEMENT IN THE MANUFACTURE OF SOAP.

Specification forming part of Letters Patent No. 41,400, dated January 26, 1864.

*To all whom it may concern:*

Be it known that I, S. A. SEALY, of Brooklyn, in the county of Kings and State of New York, have invented a new and useful Improvement in the Manufacture of Soap; and I do hereby declare that the following is a full, clear, and exact description of the same.

This invention consists in a composition of grease, flour, sal-soda, borax, salt, tartar, and alkali, which are mixed together in suitable proportions and in a peculiar manner, as will be hereinafter more fully explained, so that by the combination of the flour with the grease the latter is enabled to combine with a much larger quantity of alkali than it can without the flour, or when the flour is first mixed with the alkali, and a soap is produced which is not liable to shrink, and possesses superior washing qualities.

The proportions in which I mix the above-named ingredients together is about as follows: Grease, one hundred parts; flour, fourteen parts; sal-soda, six parts; borax, one part; salt-tartar, one part; alkali, one hundred parts. The grease is first mixed with vegetable flour of any description, whether the same be wheat-flour, potato-starch, corn-flour, or other vegetable equivalent, and by doing so the grease is caused to penetrate the flour and to spread over a comparatively large surface. If the alkali and the other ingredients are then added, said alkali is brought in immediate contact with every minute particle of the grease, and a much larger quantity of alkali will be absorbed by a certain quantity of grease than without the flour, or when the flour is added to the alkali previous to mixing it with the grease.

I am well aware that the use of vegetable flour in the manufacture of soap has been previously proposed, but all attempts to use it with advantage have failed, because it has invariably been mixed with the alkali first and previous to the addition of the grease. By pursuing this course the flour, by the action of the alkali, is formed into a thick paste, and the minute particles of the alkali are surrounded by a film or stratum of the flour, whereby the same are prevented from coming in intimate contact with the grease. The soap produced in this manner, therefore, is soft, liable to shrink, and it contains only a comparatively small percentage of alkali.

By my method of mixing the flour first with the grease the alkali is enabled to combine with every particle of said grease, and a much larger quantity of it is absorbed than without the flour, or by mixing it first with flour. By adding a small percentage of sal-soda, borax, and salt-tartar the consistency of the soap and its quality to resist shrinkage is increased, and a soap is produced which has more body without an increase in its specific gravity than soaps manufactured in the ordinary manner.

I do not claim as my invention the use of vegetable flour in the manufacture of soap, as this has been previously proposed; but

What I claim as new, and desire to secure by Letters Patent, is—

1. Mixing the grease used in the manufacture of soap with a quantity of vegetable flour, about in the proportion herein specified, previous to adding the alkali, as described, so that by the flour the grease is spread or opened and all its particles are caused to come in immediate contact with the alkali.

2. The within-described composition of the ingredients above specified and mixed together in the proportion and in the manner set forth.

SAML. A. SEALY.

Witnesses:
   THOS. S. J. DOUGLAS,
   D. ROBERTSON.